(12) United States Patent
Lewin et al.

(10) Patent No.: US 10,857,701 B2
(45) Date of Patent: Dec. 8, 2020

(54) METHOD AND HEATING DEVICE FOR TEMPERATURE CONDITIONING OF PREFORMS AND BLOW MOLDING MACHINE COMPRISING SUCH A DEVICE

(71) Applicant: KHS Corpoplast GmbH, Hamburg (DE)

(72) Inventors: Frank Lewin, Tangstedt (DE); Deniz Ulutürk, Hamburg (DE); Niels Meyer, Schenefeld (DE)

(73) Assignee: KHS Corpoplast GmbH, Hamburg (DE)

( * ) Notice: Subject to any disclaimer, the term of this patent is extended or adjusted under 35 U.S.C. 154(b) by 401 days.

(21) Appl. No.: 15/134,349

(22) Filed: Apr. 20, 2016

(65) Prior Publication Data

US 2016/0318215 A1  Nov. 3, 2016

(30) Foreign Application Priority Data

Apr. 28, 2015  (DE) .................. 10 2015 005 358

(51) Int. Cl.
*B29C 35/02* (2006.01)
*B29C 49/42* (2006.01)
*B29C 49/64* (2006.01)
*B29C 49/36* (2006.01)
(Continued)

(52) U.S. Cl.
CPC ...... *B29C 35/0277* (2013.01); *B29C 35/0288* (2013.01); *B29C 49/4205* (2013.01);
(Continued)

(58) Field of Classification Search
CPC ..... B29C 49/06; B29C 49/36; B29C 49/4205; B29C 49/6418; B29C 35/0288;
(Continued)

(56) References Cited

U.S. PATENT DOCUMENTS 3,975,618 A * 8/1976 Goos ..................... B29B 13/024
219/388
4,076,071 A * 2/1978 Rosenkranz .......... B29B 13/023
165/263
(Continued)

FOREIGN PATENT DOCUMENTS

DE  2427611 A1  12/1975
DE  19906438 A1  8/2000
(Continued)

OTHER PUBLICATIONS

Damien Muzzolini, FR-2950284, machine translation. (Year: 2011).*

*Primary Examiner* — Robert C Dye
*Assistant Examiner* — Sedef E Paquette
(74) *Attorney, Agent, or Firm* — Rankin, Hill & Clark LLP

(57) ABSTRACT

A heating apparatus that includes a plurality of heating devices for temperature conditioning of preforms made of a thermoplastic material to a temperature and temperature distribution suitable for blow molding, and a transport chain guided on a revolving chain path. The preforms are transported through the heating apparatus by the transport chain along a transport path. Along a heating section that is part of the transport path, the plurality of heating devices are stationarily arranged one after another in a transport direction. On at least one side facing the heating devices, counter reflectors are provided, which together with the heating devices form a tunnel-like heating area through which the preforms are transported for heating. At least one counter reflector travels along with the preform through the heating section.

14 Claims, 10 Drawing Sheets

Figure 1:
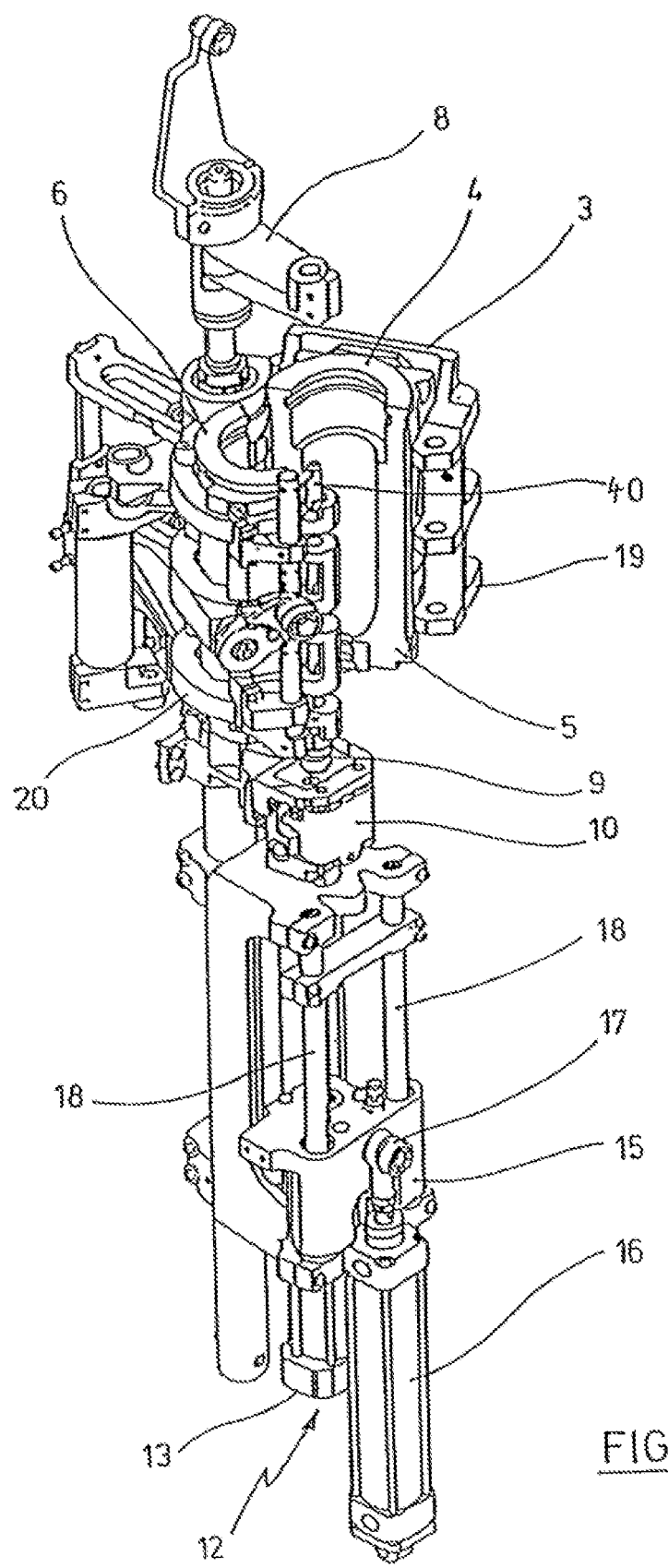

(51) Int. Cl.
    *B29L 31/00* (2006.01)
    *B29C 49/06* (2006.01)
    *B29K 67/00* (2006.01)

(52) U.S. Cl.
    CPC .......... *B29C 49/6418* (2013.01); *B29C 49/06* (2013.01); *B29C 49/36* (2013.01); *B29K 2067/003* (2013.01); *B29L 2031/712* (2013.01); *B29L 2031/7158* (2013.01)

(58) Field of Classification Search
    CPC .......... B29C 35/0277; B29L 2031/712; B29L 2031/7158; B29K 2067/003
    USPC ........................................................ 264/535
    See application file for complete search history.

(56) References Cited

U.S. PATENT DOCUMENTS

| | | | |
|---|---|---|---|
| 4,079,104 A * | 3/1978 | Dickson | B29C 49/6445 264/458 |
| 4,147,487 A | 4/1979 | Dickson et al. | |
| 4,571,173 A * | 2/1986 | Chang | B29C 49/6409 264/520 |
| 5,346,386 A | 9/1994 | Albrecht et al. | |
| 5,648,026 A | 7/1997 | Weiss | |
| 6,361,301 B1 | 3/2002 | Scaglotti et al. | |
| 2010/0314806 A1* | 12/2010 | Haesendonckx | B29C 49/6436 264/535 |
| 2013/0052295 A1* | 2/2013 | Schoenberger | B29C 49/64 425/526 |
| 2013/0220769 A1 | 8/2013 | Stein et al. | |
| 2014/0161924 A1* | 6/2014 | Linke | B29C 49/4205 425/526 |
| 2015/0083364 A1 | 3/2015 | Winzinger | |

FOREIGN PATENT DOCUMENTS

| | | | | |
|---|---|---|---|---|
| DE | 102010020092 A1 | 11/2011 | | |
| DE | 102012025207 A1 | 7/2014 | | |
| FR | 2950284 A1 * | 3/2011 | ......... | B29C 49/6445 |
| WO | WO-2013034309 A1 * | 3/2013 | ......... | B29C 49/4205 |

* cited by examiner

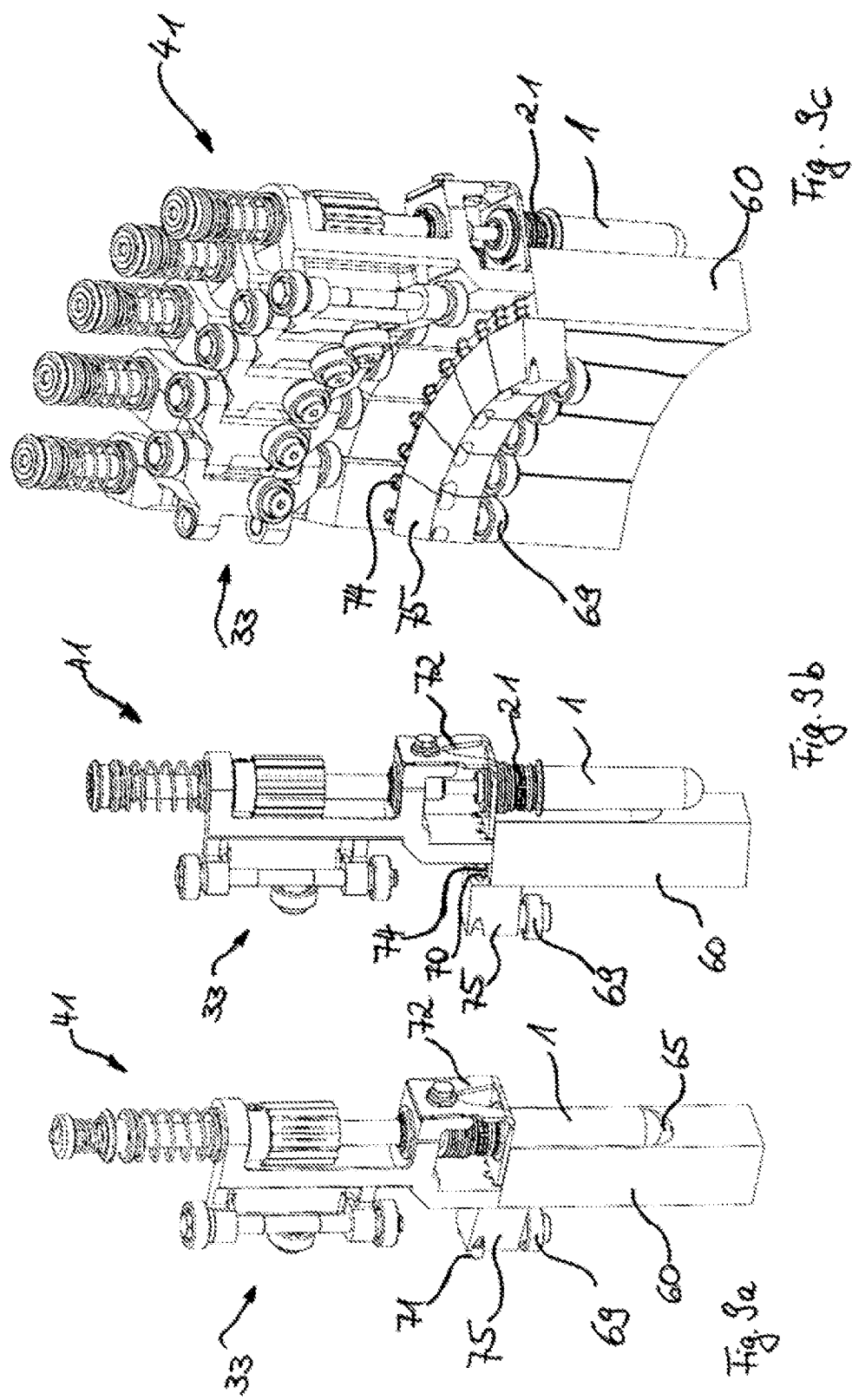

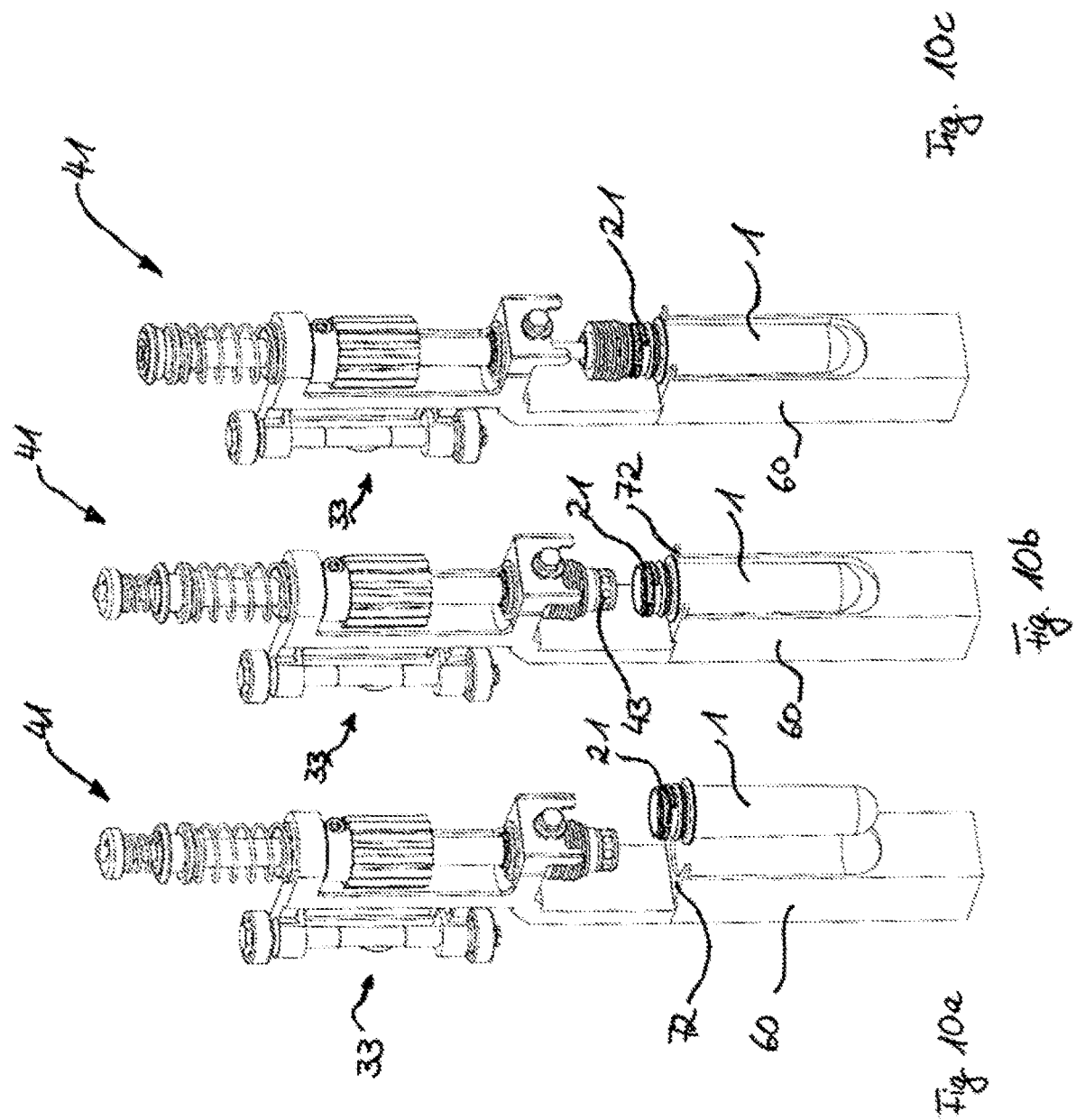

METHOD AND HEATING DEVICE FOR TEMPERATURE CONDITIONING OF PREFORMS AND BLOW MOLDING MACHINE COMPRISING SUCH A DEVICE

The invention relates to a heating apparatus with a plurality of heating devices for temperature conditioning of preforms consisting of a thermoplastic material to a temperature and temperature distribution suitable for blow molding. The heating apparatus, often also referred to as oven, is generally, for example, a component of a blow molding machine or blowing machine. The heating apparatus comprises transport elements which support handling apparatus, and which together can therefore also be referred to as transport and handling means, since they are used jointly for the transport and handling of the preforms through the heating apparatus along a transport path. During the passage through the heating apparatus, the preforms sweep over a movement path. The transport elements are connected to one another in a chain-like manner and guided on a revolving chain path. The transport elements are thus implemented as a transport chain guided on a revolving chain path, wherein the transport elements in each case form the chain links. This revolving transport chain and the chain path described by this revolving chain determines the transport path of the preforms through the heating apparatus and also the movement path of the preforms, that is to say the spatial area where the preforms sweep over the transport path. The transport and handling means can be configured, for example, as transport mandrels supported by a transport chain, said mandrels existing in numerous known designs in the prior art. The transport elements form the chain links and support the handling apparatus for the preforms. Along a heating section, which is part of the transport path of the preforms through the heating apparatus, several heating devices are stationarily arranged one after the other in transport direction. These heating devices can be, for example, heating boxes according to the prior art. On at least one side facing the heating devices, reflectors are arranged, which, in the area of the heating devices form together with the latter a tunnel-like heating area through which the preforms are transported for heating. Due to their arrangement opposite from the heating devices, these reflectors are referred to as counter reflectors. In addition, bottom reflectors or mouth reflectors that protect the mouth section of the preforms can be provided. At least in the area of the heating section, a traveling counter reflector is associated with each preform or each transport and handling means, counter reflector which is designed to travel with the preform through the heating section. The preform and the associated counter reflector thus move together through the heating section.

Moreover, the invention relates to a method for temperature conditioning of preforms consisting of a thermoplastic material to a temperature and temperature distribution suitable for blow molding. This temperature conditioning occurs in a heating apparatus which comprises heating devices. The heating apparatus, often also referred to as oven, is generally, for example, a component of a blow molding machine or blowing machine. Moreover, this heating apparatus comprises several transport and handling means for the transport and handling of the preforms through the heating apparatus. The transport occurs along a transport path inside the heating apparatus, wherein the preforms on this transport path sweep over a movement path. The transport and handling means thus comprises a transport chain, which is guided on a revolving chain path and which has several chain-member-type transport elements connected to the transport chain. This revolving transport chain and the chain path described by this revolving chain determine the transport path of the preforms through the heating apparatus, and also the movement path of the preforms, that is to say the spatial area over which the preforms sweep over the transport path. The transport and handling means can be configured, for example, as transport mandrels supported by a transport chain, said mandrels existing in numerous known designs in the prior art. The transport elements form the chain links and support the holding apparatus for the preforms. Along a heating section, which is part of the mentioned transport path of the preforms through the heating apparatus, several heating devices are stationarily arranged one after the other in transport direction. These heating devices can be, for example, heating boxes according to the prior art. On at least one side opposite from the heating devices, reflectors are provided. Due to their arrangement opposite from the heating devices, these reflectors are referred to as counter reflectors. In addition, bottom reflectors or mouth reflectors that protect the mouth section of the preforms can be provided. In the area of the heating devices, the mentioned reflectors together with said heating devices form a tunnel-like heating area through which the preforms are transported for the purpose of the heating. At least in the area of the mentioned heating section, a traveling reflector is associated with each preform or each transport and handling means, said reflector travelling with the preform and moving with it through the heating section.

The invention moreover relates to a blow molding machine, also referred to as blowing machine, with blowing stations for blow molding preforms into containers with a heating apparatus as defined at the start.

Finally, the invention relates to transport and handling means for use in a heating apparatus as defined at the start.

When molding a container by blowing pressure action, preforms made of a thermoplastic material, for example, preforms made of PET (polyethylene terephthalate), are supplied, within a blowing machine, that is to say within a device for production by blow molding of finished containers from preforms, to different processing stations. Typically, such a blow molding machine or blowing machine comprises a heating apparatus as well as a blowing device, in the area of which the preform, which has undergone a temperature adjustment before in the heating apparatus, is expanded by biaxial orientation to form a container. The expansion occurs, for example, by means of pressurized air, which is introduced into the preform to be expanded. The process technology course in the case of such an expansion of the preform is explained in DE-OS 43 40 291. The introduction of the pressurized gas, mentioned at the start, also comprises the pressurized gas introduction into the developing container bubble, as well as the pressurized gas introduction into the preforms at the beginning of the blow molding process or blowing process. Other fluids for blow molding are also known, and, in particular, it is also known to use the filling material to be filled into the container as blowing fluid. Anyhow, the general description below is made using the example of a blowing machine that is run with pressurized gas, although the invention is not limited to such blowing machines.

The basic construction of a blowing station for container molding is described in DE-OS 42 12 583. Possibilities for temperature conditioning of the preforms are explained in DE-OS 23 52 926. Reference is made explicitly to the cited documents, and, to that extent, a further description concerning blowing stations and temperature conditioning can be dispensed with.

Within the apparatus for blow molding, the preforms as well as the blown containers can be transported by means of different transport and handling devices. For example, it is known to use transport mandrels onto which the preforms are plugged. However, the preforms can also be handled and transported with other supporting devices. The use of grippers for handling and transporting preforms and the use of clamping mandrels which can be introduced for support into a mouth area of the preform are also part of the available constructions.

The transporting and handling of containers and preforms using transfer wheels are described, for example, in DE-OS 199 06 438, in an arrangement of a transfer wheel between a blowing wheel and an output section, and of an additional transfer wheel between the heating section and the blowing wheel.

The already-explained handling of the preforms occurs, on the one hand, in the so-called two-step methods, in which the preforms are first produced by an injection molding method and then stored temporarily and conditioned in terms of their temperature and blow molded to form a container only later. On the other hand, in the so-called single-step methods, there is a use in which the preforms are brought to the appropriate temperature after they have been produced by an injection molding technique and sufficiently solidified, and subsequently inflated.

With regard to the blowing stations used, different designs are known. In blowing stations that are arranged on rotating transport wheels that is to say on a so-called blowing wheel, a book-like openability of the mold support is commonly encountered. However, it is also possible to use mold supports that are slidable relative to one another or guided in another way. In the case of stationary blow stations that are particularly suitable for including several cavities for container molding, plates arranged typically parallel to one another are used as mold supports.

Before carrying out the heating, the preforms are typically plugged onto the transport mandrels that transport the preform either through the entire blowing machine or revolve only in the area of the heating apparatus. In an upright heating of the preforms so that the mouths of the preforms are oriented in a vertical direction downward, the preforms are usually plugged on a sleeve-shaped supporting element of the transport mandrel. In the case of a suspended heating of the preforms, wherein the preforms with their mouths are oriented in vertical direction upward, spreading mandrels are generally introduced into the mouths of the preforms which firmly clamp the preforms. From the prior art, both active, controllable clamping elements and also passive clamping elements are known. Passive clamping elements produce, for example, clamping due to an acting spring force against which the preforms are plugged onto the transport mandrels, or against which the preforms are taken off the transport mandrel, whereas, in the case of the active transport mandrels, an actuation must occur, for example, by an actuator, or, for example, by an external cam control which triggers the clamping mechanism or which releases the clamping engagement again.

In order to shorten the required heating time it is known to use NIR radiators in the area of the heating section, whose heating radiation is emitted in the near infrared range, typically with wavelengths between 0.4 and 1 micrometer. The heating of the preforms occurs here primarily by radiation absorption when the NIR radiation passes through the preform material. For the optimization of the energy yield, such heating sections are provided with a plurality of mirror surfaces, in order to avoid or at least strongly reduce to the extent possible the absorption of heat radiation by components of the heating section, and in order to reflect the NIR radiation again for heating onto the preform.

Typically, the heating sections are configured at least partially in some sections to be tunnel-like and, for this purpose, they are delimited on one side of the housing of a support for the heating element as well as on the facing side of a reflector facing this housing, subsequently referred to as counter reflector. In vertical direction, delimitation by a floor and/or cover can occur, depending on whether the preforms are transported with their mouths oriented in vertical direction upward or downward through the heating section. These vertical delimitations can also be configured as reflectors. In addition, it is conventional to protect the mouth area of the preforms, for example, by means of traveling reflectors referred to hereafter as mouth reflectors, from heating radiation, since this area is already produced with finished features and is not to undergo further deformation during the blow molding.

However, in the prior art, not only counter reflectors arranged stationarily opposite from the heating elements are known, which must be distinguished from the above-described bottom or mouth reflectors, but also counter reflectors that travel with the preform. Thus, for example, U.S. Pat. No. 4,147,487 presents a heating apparatus with transport elements in the form of a transport mandrel. Semi-cylindrically arched counter reflectors that enclose the preform are arranged on the side of the preform facing away from the heating element. These counter reflectors are moved by the same transport mechanism as the transport mandrels on which the preforms are plugged. The transport mandrels presented in this document here travel with the preforms held thereby through the entire blow molding machine, that is to say they are not formed as a revolving transport chain. This results from the circumstance that the transport mandrel, among other features, is also guided along to the blowing station.

DE 10 2012 025 207 A1 also presents counter reflectors traveling with the preforms. The counter reflectors migrate with the handling device along the transport path of the preform.

It has been found to be problematic in the case of counter reflectors which travel with the preforms that said counter reflectors have to be configured, on the one hand, to have a shape that is adapted as much as possible to the preforms. The counter reflectors should also enclose the preforms with the smallest possible spacing. Due to the desired shape adaptation of the counter reflectors to the preform outer contour, said counter reflectors also have to be exchanged when the preform type is changed. To that extent, it is considered disadvantageous in the known prior art if this exchange cannot occur easily and rapidly. An additional problem results, in the case of traveling counter reflectors, in that these counter reflectors should not hinder the loading and unloading of the transport and handling means with the preforms in the transfer areas between the heating apparatus and the upstream or downstream machine elements of the blowing machine. These upstream or downstream machine elements can be transfer wheels, for example. In the constructions known to date this is achieved in that the counter reflectors are arranged with greater spacing from the preforms, so that, for example, the transport mandrels used can have free access to the preforms and clampingly grip them. In particular, the spacing of the counter reflectors is selected to be of a size so that the preforms can be raised and lowered in vertical direction. The latter feature is required, for example, when a mouth reflector is provided, which is to shield the mouth area of the preform against heat radiation and which is formed for this purpose as a plate with a passage opening. In the case of such mouth reflectors, the preform is supplied to a first height level, clampingly gripped by a transport mandrel, and subsequently moved in vertical direction to a second height level, that is to say raised as a rule, until the preform has assumed its desired position relative to the mouth reflector. This desired position can consist, for example, in that the neck ring of the preform is taken up in the opening of the mouth reflector. For the implementation of such vertical movements and for the approaching of the transport mandrel to the preform, the counter reflector must leave sufficient space and therefore, in the prior art, the spacing of the counter reflector from the preform is given a relatively large size. It would be desirable to have an arrangement of the counter reflector that is even closer to the preform, in order to be able to reflect the heating radiation even more efficiently back to the preform.

The problem of the present invention consists in indicating a way to eliminate the mentioned disadvantages. Methods and apparatuses are to be provided by means of which, in the case of counter reflectors that travel with the preforms, the densest possible arrangement of the counter reflectors relative to the preforms is possible, wherein the counter reflectors are formed so as to be adapted in terms of their shape as far as possible to the preforms, and wherein the mentioned disadvantages are eliminated.

This problem is solved by a heating apparatus having the features disclosed herein, with a method according having the features disclosed herein, as well as with a blow molding machine having the features disclosed herein, and with transport and handling means having the features disclosed herein.

Additional advantageous embodiments are the subject matter of the dependent claims or result from advantageous developments that are indicated in the figure description.

According to the invention, it is provided that the counter reflectors are fastened to chain-link-type transport elements and extend into the movement path of the preforms and partially enclose the preforms in radial direction. As a rule, the preforms are configured with a cylindrical basic shape, so that the counter reflectors are also configured accordingly complementarily, that is to say, in the case of preforms with a cylindrical basic shape, with a correspondingly complementarily shaped cylindrical recess or curvature, so that the counter reflector can enclose the preform partially cylindrically. In a similar way, this problem is solved by a method in which the counter reflectors are fastened to the chain-link-like transport elements and extend into the movement path of the preforms.

Due to the fastening of the counter reflectors to the chain-link-type transport elements, there is a plurality of more reliable and more energy-optimized design possibilities, since small spacings between counter reflector and preform can be implemented. In particular, there is no need here to synchronize between the movement of the counter reflectors and the preforms.

In order to be able to position the counter reflectors particularly close to the preform, it is advantageous to provide for movability of the counter reflector relative to the transport element to which the counter reflector, for example, is fastened. This movability can be, for example, in axial direction, that is to say in longitudinal direction of the preform with which the counter reflector is associated. A movability in radial direction is also possible, that is to say transversely to the mentioned axial direction or transversely to the longitudinal direction of the associated preform. Mixed forms of these two mentioned motion directions are also conceivable. Due to this possibility of a relative movement between counter reflector and transport element, the counter reflector, for example, can be moved if needed from a first position into a second position differing from the first position, wherein this second position is characterized, for example, in that the spacing from the preform is increased. As a result, the preform can be moved, for example, in vertical direction, and the access to the preform is as a result facilitated for the holding apparatus or made possible in the first place. When this access is no longer needed or when a vertical movement of the preform or another movement of the preform no longer needs to be performed, the counter reflector can be moved again back into the starting position, that is to say into a position located near the preform.

Advantageously, the transport elements for the movement of the counter reflector comprise guide means on which the counter reflectors are slidably guided in the desired direction. These guide means can be, for example, guide pins that ensure an axial or radial guiding. Here too, mixed forms between axial and radial guide direction are possible.

It is proposed advantageously that the counter reflectors are held by a spring force in a first position. This promotes maintaining the counter reflectors in a defined position and also the possibility of returning them into this defined position due to the spring force. The movement of the counter reflector from the first position into a second position then occurs against the spring force.

Advantageously, this first position in which the counter reflector is held by a spring force is the so-called heating position. This is also characterized in that the counter reflector extends into the movement path of the preform or is at a small distance from the preform. This position is therefore referred to as heating position, since this position should be assumed preferentially during the run through the heating section in which the counter reflector in fact fulfills its actual function, which is to reflect the heating radiation onto the preform. In this heating position, the counter reflector encloses the preform partially. The deflection out of this heating position into another position here occurs in such a manner that the separation between counter reflector and preform is increased. In particular, it has been thought of that this deflection occurs in such a manner that the counter reflector no longer extends into the movement path of the preform. The preform could therefore be moved further in its transport direction without colliding with the counter reflector. In this deflected position, the preform is accessible for a loading and unloading of the transport and handling means and for the handling access of holding apparatus, for example, of grippers or of transfer wheels.

The control of the movement of the counter reflectors occurs advantageously via a cam control. It would also be conceivable to provide actuators or motor drives. However, the control occurs in a particularly simple way via a stationary external control cam. The counter reflector has a cam roller which thus revolves with the counter reflector and interacts with the external control cam. This interaction with the control cam leads to the desired movement of the counter reflector in axial and/or radial direction. This movement is advantageously carried out in an area arranged outside of the heating section. In particular, this movement thus occurs, for example, in an area in front of the heating section in order to enable a loading of the holding apparatus with the preforms. In particular, it has been thought of that the movement of the counter reflectors is carried out in the area of the reversal of the revolving chain path. In an additional area outside of the heating section, that is to say in a removal area for the preforms, it is preferable and advantageous that a movement of the counter reflectors occurs and that the control cam is designed accordingly. In this removal area, a handling access to the preforms must occur, so that said preforms can be conveyed further after the temperature conditioning to the blowing stations. Here too, a movement of the counter reflectors for the purpose of the removal of the preforms is found to be advantageous.

An alternative to the movability of the counter reflector is represented by a mouth reflector that has a design that is radially open outward in the shape of a U. In such a mouth reflector, no vertical raising of the preform is needed, instead said preform can be introduced in horizontal direction into the mouth reflector which has an open U-shaped design, and removed. Since no lift movement is needed, the counter reflectors can nevertheless be configured to be adapted in shape and enclose the preform in close proximity, as long as the movement in horizontal direction is not impeded by the shaping of the counter reflector.

Advantageously, the mouth reflector is here arranged on the counter reflector and as a result is part of the counter reflector. The mouth reflector and the counter reflector can be configured, for example, to form a single part. It is also conceivable to arrange the mouth reflector slidably on the counter reflector, for example, in order to prevent a collision with transport wheels or with transport grippers.

In the case of a change of the preform type or in the case of a change of the preform geometry due to a rearrangement of the container to be blow molded, an exchangeability of the counter reflectors is desirable and necessary. To that extent, it is advantageously proposed that the counter reflector be fastened with a quick-change system to the transport element. In particular, it is advantageously proposed that the selected quick-change system can be actuated without tool. This too leads to a shortening of the change durations when the counter reflectors are exchanged.

The advantages of the inventive blow molding machine, of the inventive method, and of the inventive transport and handling means result in a similar way from the above explanations of the advantages of the inventive apparatus.

In the drawings, embodiments of the invention are represented diagrammatically.

Figure 2:
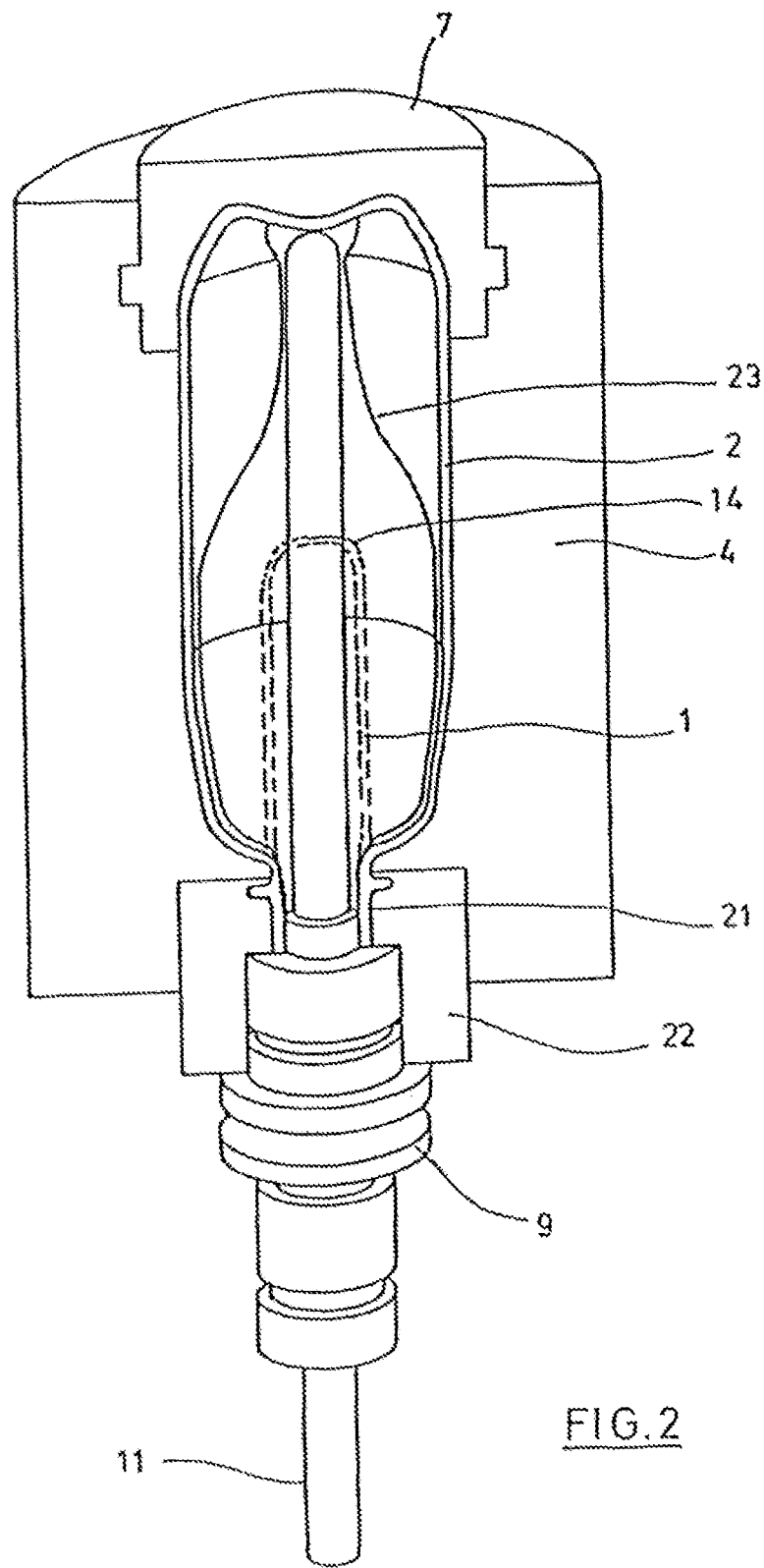
Figure 3:
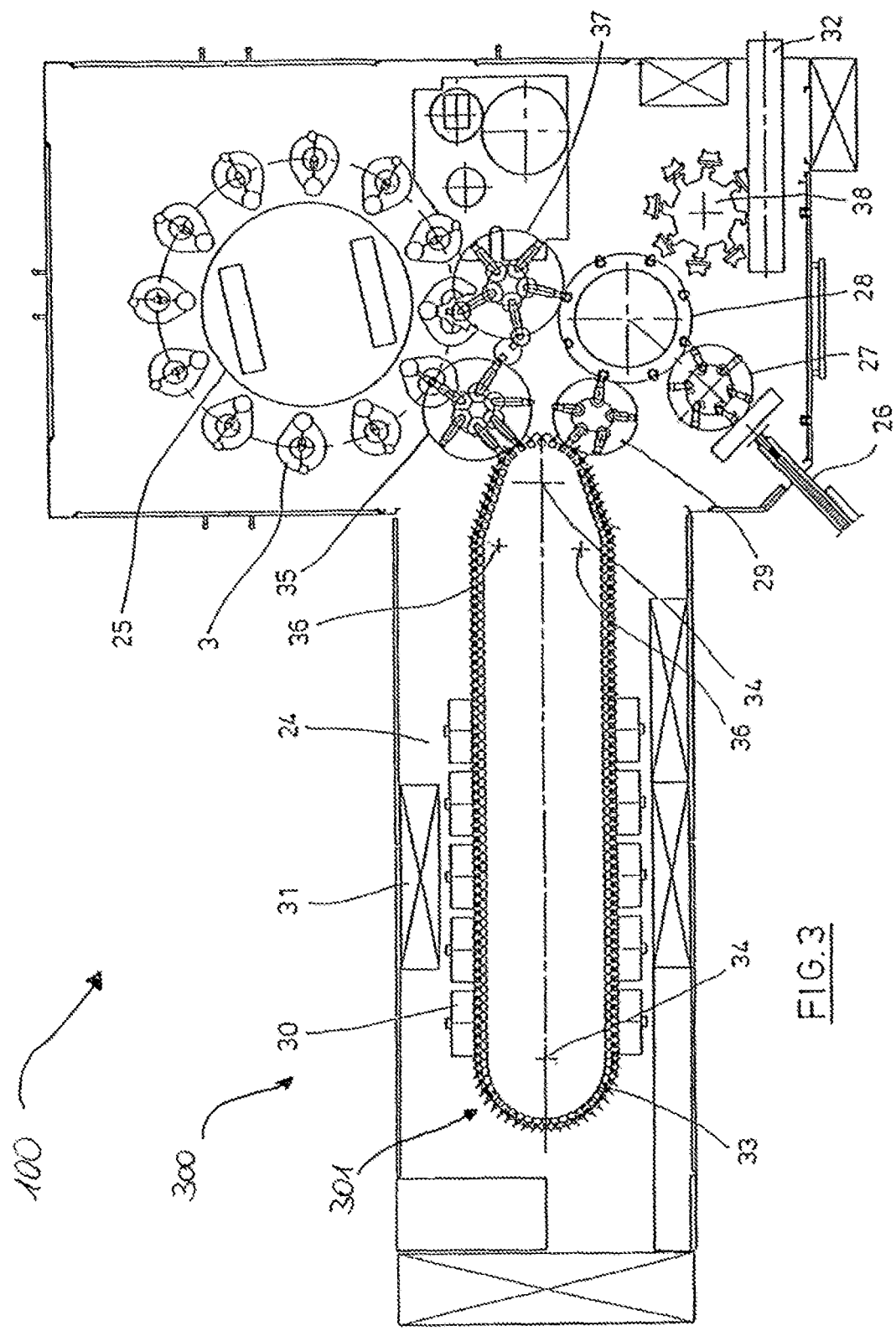
Figure 4:
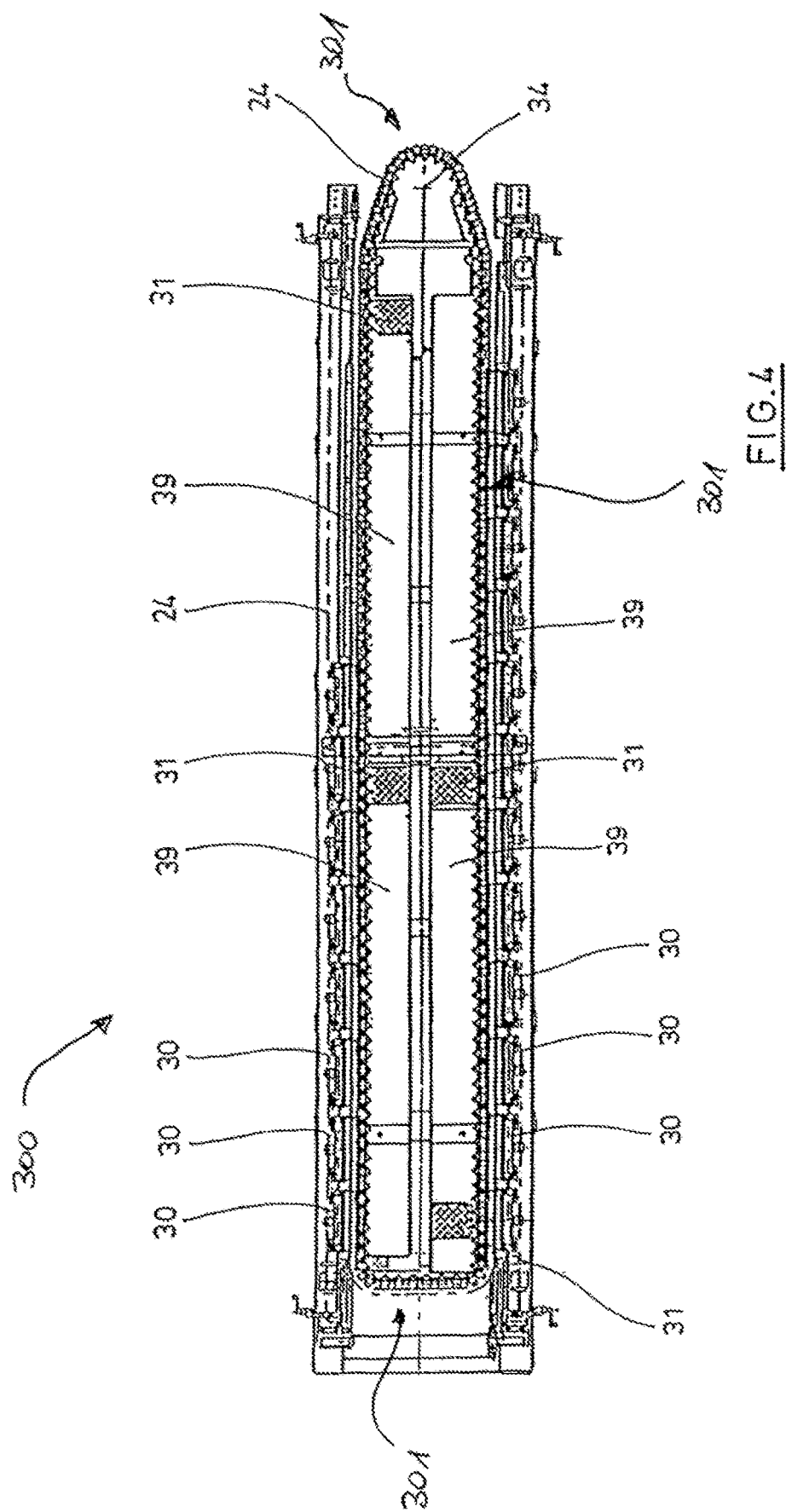
Figure 5:
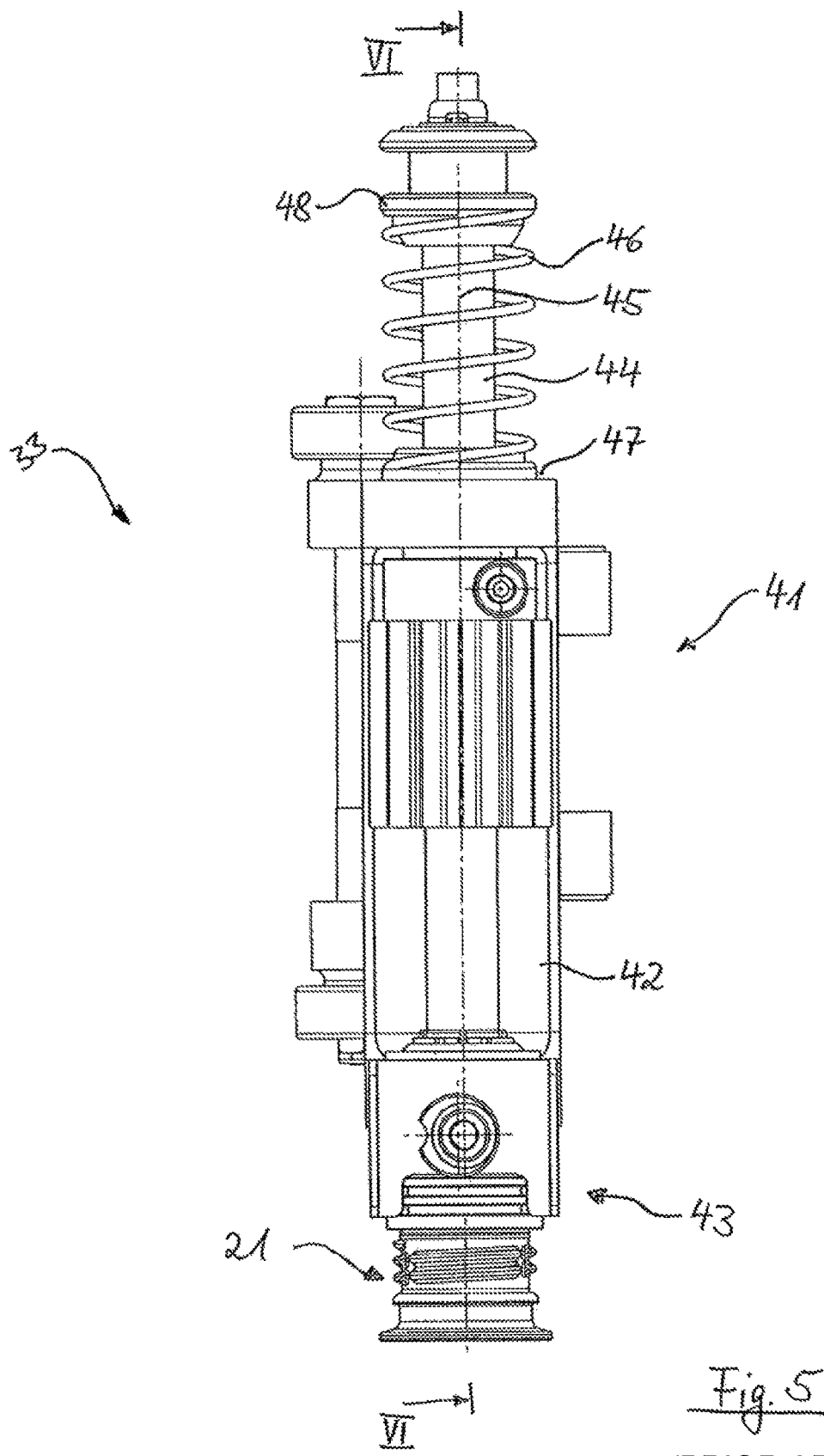
Figure 6:
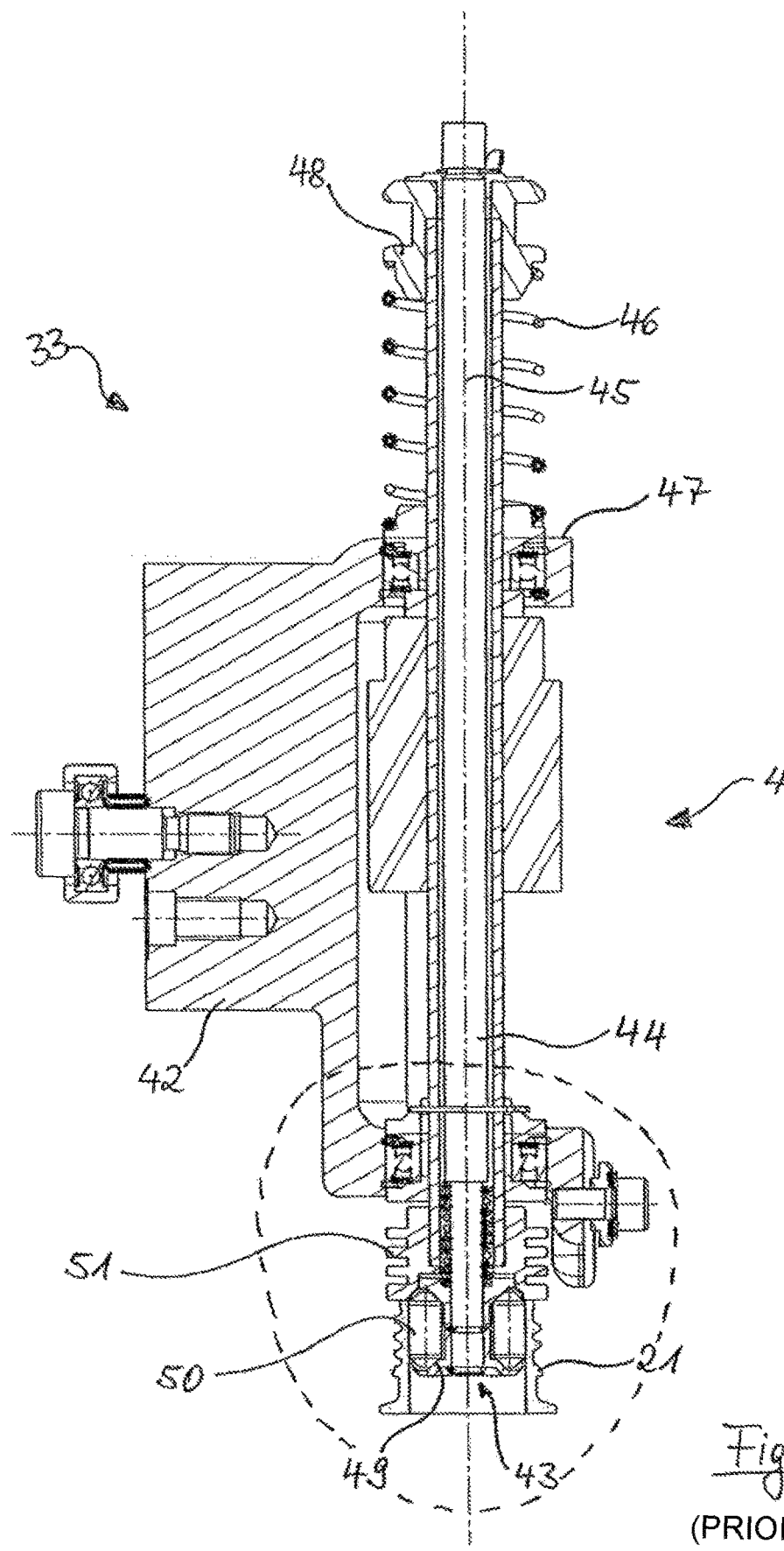
Figure 7:
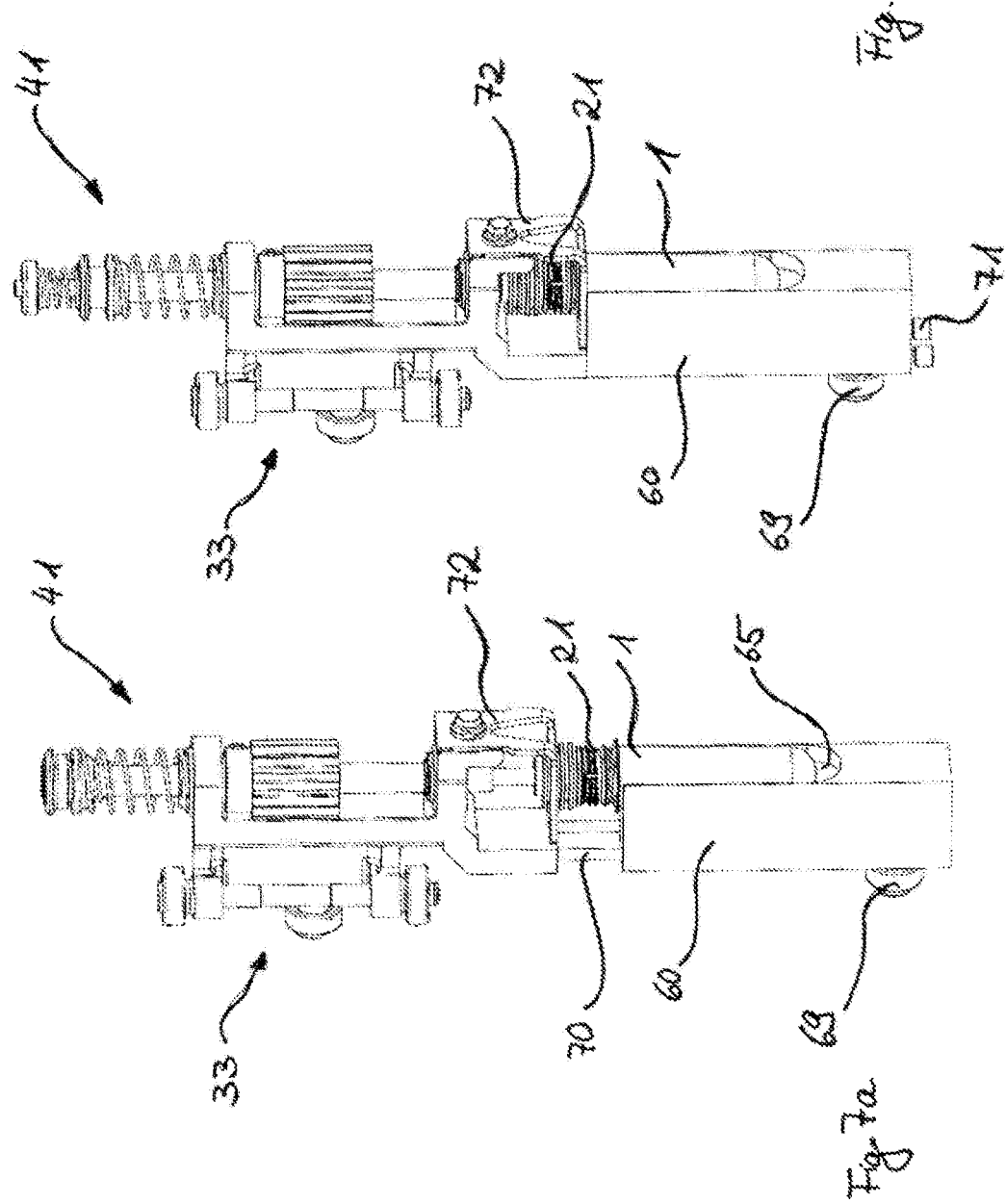
Figure 8:
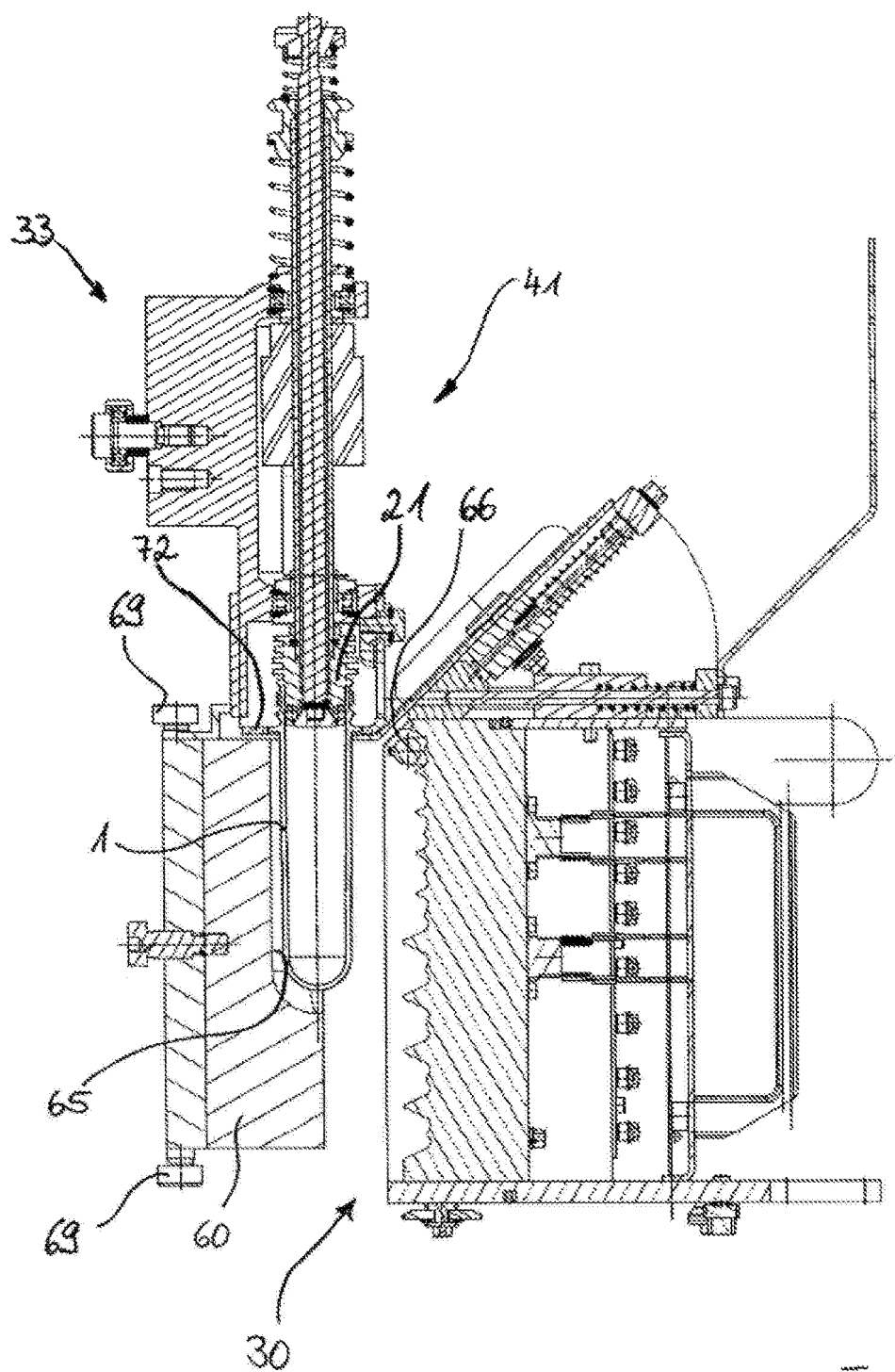

FIG. 1 shows a perspective representation of a blowing station for producing containers from preforms, FIG. 2 shows a longitudinal section through a blowing mold in which a preform is stretched and expanded, FIG. 3 shows a sketch for illustrating a basic construction of an apparatus for blow molding containers, FIG. 4 shows a modified heating section with increased heating capacity, FIG. 5 shows a side view of a holding apparatus from the prior art, FIG. 6 shows a vertical section according to cutting line VI in FIG. 5, FIG. 7a, 7b show perspective views of a transport and handling means with counter reflectors fastened thereto, in a first and a second counter reflector position, FIG. 8 shows a longitudinal section through a heating device, a transport mandrel and a counter reflector in the area of the heating section through which a preform and the counter reflector travel jointly, FIGS. 9a, 9b and 9c show perspective views of a transport and handling means with counter reflector fastened thereto in a second embodiment variant in a first counter reflector position and in a second counter reflector position which is shifted in radial direction relative to said first counter reflector position, FIGS. 10a, 10b and 10c show perspective views of a transport and handling means according to the invention with a counter reflector with an opening reflector, which is fastened to said transport and handling means.

The basic construction of an apparatus for shaping preforms (1) to containers (2) is represented in FIG. 1 and in FIG. 2. The arrangement can here occur as represented or in a vertical plane rotated by 180°.

The apparatus for forming the container (2) consists substantially of a blowing station (3), which is provided with a blowing mold (4) into which a preform (1) can be inserted. The preform (1) can be an injection molded part made of polyethylene terephthalate. To enable an insertion of the preform (1) into the blowing mold (4) and to enable a removal of the finished container (2), the blowing mold (4) consists of mold halves (5, 6) and a bottom part (7) which can be positioned by a lifting apparatus (8). The preform (1) can be attached in the area of the blowing station (3) by a holding element (9). This holding element (9) can be configured, for example, according to the invention or as is known from the prior art. It is possible, for example, to insert the preform (1) by means of grippers or other holding apparatus directly into the blowing form (4). To enable a pressurized-air supply, a connecting piston (10) is arranged beneath the blowing mold (4), which supplies pressurized air to the preform (1) and at the same time produces a seal. However, in a modified construction, it is in principle also possible to use fixed pressurized-air feed lines.

A stretching of the preform (1) occurs in this embodiment example by means of a stretching rod (11) which is positioned by a cylinder (12). According to another embodiment, a mechanical positioning of the stretching rod (11) is carried out via cam segments on which gripping rollers act. The use of cam segments is particularly advantageous if several blowing stations (3) are arranged on a rotating blowing wheel (25).

In the embodiment represented in FIG. 1, the stretching system is designed so that a tandem arrangement of two cylinders (12) is provided. By means of a primary cylinder (13), the stretching rod (11) is first moved, before the start of the stretching process itself, into the area of a bottom (14) of the preform (1). During the stretching process itself, the primary cylinder (13) with extended stretching rod is positioned together with a carriage (15) supporting the primary cylinder (13) by means of a secondary cylinder (16) or via a cam control. In particular, it has been thought of to use the second cylinders (16) in a cam-controlled manner so that a current stretching position can be predetermined by a guide roller (17), which slides along a cam track during the performance of the stretching process. The guide roller (17) is pressed by the secondary cylinder (16) against the guide track. The carriage (15) slides along two guide elements (18).

After the closing of the mold halves (5, 6) arranged in the area of supports (19, 20), a locking of the supports (19, 20) relative to one another occurs by means of a locking device (40). For the adaptation to different shapes of a mouth section (21) of the preform (1), the use of separate threaded inserts (22) in the area of the blowing mold (4) is provided according to FIG. 2.

In addition to the blow molded container (2), FIG. 2 also shows the preform (1) drawn with a broken line, as well as, diagrammatically, a forming container bubble (23).

FIG. 3 shows the basic construction of a blowing machine which is provided with a heating section (24) as well as with a rotating blowing wheel (25). Starting with a preform introduction (26), the preforms (1) are transported by transfer wheels (27, 28, 29) into the area of the heating section (24). Along the heating section (24), heat radiators (30) are arranged as heating devices, as well as blowers (31) in order to adjust the temperature of the preforms (1). After a sufficient temperature adjustment of the preforms (1), the latter are transferred by a transfer wheel (35) to the blowing wheel (25) in the area of which the blowing stations (3) are arranged. The finished blow-molded containers (2) are supplied by additional transfer wheels (37, 28, 38) to an output section (32). The transfer wheel (37) here is configured as a removal wheel and the transfer wheel (38) as an output wheel.

In order to be able to shape a preform (1) to form a container (2) in such a manner that the container (2) has material properties that ensure a long usability of food items, in particular drinks, that have been filled into the container (2), special process steps must be complied with during the heating and orientation of the preforms (1). In addition, advantageous effects can be achieved by complying with special dimensioning requirements. As thermoplastic material, various plastics can be used. For example, PET, PEN or PP can be used.

The expansion of the preform (1) during the orientation process occurs by pressurized-air supply. The pressurized-air supply is divided into a preblowing phase in which gas, for example, pressurized air, is supplied at a low pressure level, and a subsequent main blowing phase in which the gas is supplied at a higher pressure level. Typically, during the preblowing phase, pressurized air at a pressure in the range from 10 bar to 25 bar is used, and during the main blowing phase, pressurized air at a pressure in the range from 25 bar to 40 bar is supplied.

In FIG. 3 one can also see that, in the represented embodiment, the heating section (24) is part of the transport path of the preforms (1). The transport of the preforms (1) occurs in the heating apparatus (300) by means of a plurality of revolving transport elements (33) which are arranged in a row in a chain-like manner and guided along reversing wheels (34, 36). The revolving transport elements (33) thus move along a chain path (301) which also forms the transport path of the preforms, since the preforms (1) are guided along the chain path (301). In particular, it has been thought to stretch to a substantially rectangular basic contour by means of the chain-like arrangement of the transport elements (33). In the represented embodiment, in the area of the expansion of the heating section (24) facing the transfer wheel (27), a single reversing wheel (34) of relatively large dimension is used, and, in the area of adjacent reversals, two reversing wheels (36) of relatively smaller dimension are used. However, in principle any desired other guides are also conceivable.

To enable an arrangement of the transfer wheel (27) and of the blowing wheel (25) relative to one another that is as dense as possible, the represented arrangement has been found to be particularly advantageous, since, in the area of the corresponding expansion of the transport path (301), three reversing wheels (34, 36) are positioned, that is to say, in each case, the smaller reversing wheels (36) are positioned in the area of the transition to the linear courses of the transport path (301), and the larger reversing Wheel (34) is positioned in the immediate transfer area to the transfer wheel (27) and to the blowing wheel (25). Alternatively to the use of chain-like transport elements (33), it is also possible to use a rotating heating wheel, for example.

After the blow molding of the containers (2) has been completed, said containers are moved out of the area of the blowing stations (3) by the transfer wheel (38) and transported to the output section (32).

In the modified heating apparatus (300) represented in FIG. 4, it is possible, due to the larger number of heating radiators (30), to adjust the temperature of a larger number of preforms (1) per unit of time. The blowers (31) here lead cooling air into the area of cooling air channels (39), which are opposite from the associated heating radiators (30) in each case and deliver the cooling air via outflow openings. Due to the arrangement of the outflow directions, a flow direction is achieved for the cooling air that is substantially transverse to a transport direction of the preforms (1). In the area of surfaces opposite from the heating radiators (30), the cooling air channels (39) can provide counter reflectors for the heat radiation; it is also possible to implement a cooling of the heating radiators (30) via the delivered cooling air.

A transport of the preforms (1) and of the containers (2) through the blowing machine (100) can occur in different ways. According to an embodiment variant, the preforms are supported at least along the substantial portion of the transport path thereof by transport mandrels. However, it is also possible to carry out a transport of the preforms using grippers that grip the preform on the outside, or to use internal mandrels that are introduced into a mouth area of the preform. In the same way, it is conceivable to use different variants in terms of the spatial orientation of the preforms.

According to a variant, the preform is supplied in the area of the preform inlet (26) with the mouth thereof oriented in vertical direction upward, then conveyed along the heating section (24) and the blowing wheel (25) in a state in which it is rotated and with the mouth thereof oriented in vertical direction downward, and rotated again before reaching the output section (32). According to another variant, the preform (2) is heated in the area of the heating section (24) with the mouth thereof oriented in vertical direction downward, but rotated again by 180° before reaching the blowing wheel (25).

According to a third embodiment variant, the preform runs through the entire area of the blowing machine (100) without undergoing any reversing processes, with the mouth thereof oriented in vertical direction upward.

FIG. 5 shows a partial representation of a side view of a preform (1) in the mouth section (21) thereof, in some areas, a holding apparatus (41) known from the prior art is introduced. This holding apparatus (41), together with the transport element (33), is an example of a transport and handling means in the sense of the claims. In the diagrammatic FIGS. 3 and 4, in each case, only the reference number 33 is indicated for the transport elements connected in a chain-like manner.

The holding apparatus (41) shown as an example comprises an element base (42), a head (43) facing the preform (1), as well as a shaft (44) connected to the head (43). The shaft (44) with the head (43) is movable relative to the element base (42) in direction of an element longitudinal axis (45). A base position of the shaft (44) relative to the element base (42) can be predetermined by a spring (46). In the represented embodiment example, the spring (46) is arranged between upper side (47) of the element base (42) and an end segment (48) protruding over the shaft (44).

According to a typical embodiment example, a plurality of element bases (42) can be connected to one another in a chain-like manner or connected to a revolving transport chain. This results in an arrangement as shown in FIGS. 3 and 4. However, the holding apparatus (41) can also be attached to revolving transfer wheels or other devices. According to a typical embodiment, a positioning of the shaft (44) relative to the element bases (42) occurs likewise in a cam-controlled manner via a cam that extends at least in some sections along a transport path of the holding apparatus (41).

FIG. 6 shows in a longitudinal section the positioning of the head (43) within a mouth section (21) of a preform (1) or of a container (2). One can see that the head (43) comprises recesses (49) in which clamping elements (50) are arranged. Outside of the area that can be introduced into the mouth section (21), the head (43) can comprise a cooling body (51), which is provided with cooling ribs for the heat radiation.

FIGS. 7a and 7b show a first embodiment example for a transport and holding means (33, 41) configured according to the invention, with a counter reflector (60) attached thereto. FIG. 7a shows the counter reflector (60) in a lowered position, while FIG. 7b shows the base position of the counter reflector (60). This base position is held spring-loaded, wherein this spring, in a manner that is not represented, is located inside the counter reflector (60), and exerts a spring force against a lowering movement of the counter reflector (60).

The transport and handling means (33, 41) according to the invention and represented as an embodiment example consists of a transport element (33) as well as a holding apparatus (41) supported thereby, as described above in reference to FIGS. 5 and 6 as an example. In addition, the represented transport and handling means (33, 41) comprises a counter reflector (60) slidably mounted on the transport element (33) in axial direction. This counter reflector (60) has, on the side thereof that faces a preform, a recess (65) with inner contour the shape of which is adapted to the preform (1). The preform (1) represented is partially received by the recess (65) and enclosed, in reference in FIG. 8, partially cylindrically and preferably largely equidistantly. On an outer side facing away from the preform, for example, a control roller (69) is arranged, which cooperates with an external control cam that is not represented.

The counter reflector (60) is guided on guide pins (70) in axial direction. These guide pins (70) are stationarily fastened to the transport element (33) and extend from the transport element (33) in vertical direction downward. The counter reflector (60) comprises guide bores that are not visible in the selected representation. The guide pins (70) extend in these guide boreholes. The counter reflector (60) is secured against falling down in vertical direction by quick-fastening screws (71) which, in the base position shown in FIG. 7b, protrude on the bottom side over the counter reflector (60) and can be loosened without tool for the purpose of replacing the counter reflector (60), for example.

The holding apparatus (41), in FIGS. 7a and 7b, is implemented as a transport mandrel, as it is described, for example, in reference to FIGS. 5 and 6. In the position of this transport mandrel shown in FIG. 7a, the head (43) is immersed in the mouth section (21) of the preform (1). The preform (1) is located in a lowered position beneath the mouth reflector (72). In FIG. 7b, the preform (1) and the transport mandrel supporting the preform (1) is in a raised position in which the mouth section (21) of the preform (1) is lifted until the mouth reflector (72) shields the mouth section (21) against heat radiation, as can be seen in FIG. 8 in a cross-sectional representation.

In the positioning of the counter reflector (60), represented in FIG. 7a, which is predetermined by the external control cam, the preform (1) receives freedom of movement in vertical direction so as to assume the positioning represented in FIG. 7a, which, for example, corresponds to the transfer position of a transfer wheel. The represented positioning of the counter reflector (60) and of the preform (1) is thus assumed, for example, in the area of the transfer wheel (29) of FIG. 3. In the area of the removal wheel (35) as well, a positioning of counter reflector (60) and preform (1), as represented in FIG. 7a, is assumed, while the positioning represented in FIG. 7b is assumed at the time of the passage through the heating section (24). This positioning is also represented in the cross-sectional representation of FIG. 8, in which a passage through a heating box occurs.

FIG. 8 shows a cross section in the area of the heat radiator (30) through a transport and handling means (33, 41) with a traveling counter reflector (60). In the represented embodiment example, the counter reflector (60) assumes the heating position shown in FIG. 7b, that is to say the counter reflector (60) is in a positioning close to the preform, that is to say at a small distance from the preform (1). The counter reflector (60) is fastened to the transport element (33). The transport element (33) in addition supports the holding apparatus (41) which can be configured, for example, in the manner explained in reference to FIGS. 5 and 6. As to the heating device (30), only one heating element (66) is shown, wherein, as a rule, in the area of the heating section (24) several heating elements (66) are arranged in vertical direction one above the other. These additional heating elements would thus be arranged distributed beneath the represented heating element (66) over the height extent of the preform (1).

In FIG. 8, one can see that the traveling counter reflector (60) comprises, facing the preform, an inner contour (65) which is adapted in shape in order to enclose the preform (1) as equidistantly as possible over the reflector-facing partial circumferential area thereof at a small distance. In this manner, the heat radiation emitted by the heating element (66) can be reflected efficiently and turned back onto the preform (1). Since, as can be seen, for example, from FIG. 7a, the traveling counter reflector (60) is moved away from the transport element (33), for example, in the reversal areas of the chain path (301), and, for example, in a cam-controlled manner, freedom of movement exists nevertheless for the preform (1) toward and away from the transport element (33) and toward and away from the holding apparatus (41) supported thereby, as required typically for plugging on and removing processes, for example, in the interaction with grippers or transfer wheels known in the prior art. In particular, a height-wise movement of the transport element (33) or of the holding apparatus (41) can be carried out, without colliding with the counter reflector (60).

FIGS. 9a, 9b and 9c show, in perspective views, inventive transport and handling means (33, 41) with counter reflector (60) attached thereto according to a second embodiment variant. While, according to the embodiment variant of FIGS. 7a and 7b, a movement of the counter reflector (60) occurred relative to the transport element (33) in vertical direction or in axial direction of the preform (1), according to the embodiment example of FIGS. 9a to 9c, a relative movement occurs between the counter reflector (60) and the transport element (33) in a radial direction away from the preform (1). Below, only changes in comparison to the embodiment of FIGS. 7a and 7b are to be described.

FIG. 9c shows a partial detail of the transport chain (301) shown, for example, in FIG. 3 that is to say in a reversal area, in particular in the area of the transfer wheel (35) or of the inlet wheel (29). Accordingly, the transport chain (301) assembled from several transport elements (33) has a curved course. Due to this curved course, there are gaps between adjacent counter reflectors (60). In the positioning of the counter reflectors (60) represented in FIG. 9c, these gaps barely remain visible, since the counter reflectors (60) have been shifted radially inward. The gaps between the transport elements (33) above the counter reflectors (60) supported by said transport elements can be seen better.

In the positioning represented in FIG. 9a, the counter reflector (60) assumes the base position thereof in which it is held applied by spring force. This spring force is applied by a spring (74) which is arranged coil-shaped on radially inward pointing guide pin (70). The guide pins (70) are located on the side of the transport element (33), which faces away from the preform, and they extend in radial direction up to a guide element (75) of the counter reflector (60). This guide element (75) has guide boreholes into which the guide pins (70) engage. A quick-fastening screw (71) ensures that the counter reflector (60) is slidably held on the guide pins (70). The guide element (75) moreover comprises a control roller (69) which cooperates with an external control cam, which is not represented, in a manner known from the prior art.

In the positioning represented in FIG. 9a, the counter reflector (60) encloses the preform (1) with small spacing. The preform (1) is shown in a raised positioning, i.e., the mouth area (21) is shielded by the mouth reflector (72) against heat radiation.

In the positioning represented in FIG. 9b, the counter reflector (60) is slid in a cam-controlled manner from the base position thereof in radial direction, so that the preform (1) can be lowered in the represented manner. It is now possible, for example, to transfer the preform (1) to a transfer wheel (29, 35).

The positioning represented in FIG. 9b is also assumed in FIG. 9c and corresponds, for example, to the positioning desired in the area of the transfer wheels (35, 29). In comparison, the positioning represented in FIG. 9a corresponds to the arrangement of counter reflector (60) and preform (1), which is desired in the area of the heating section (24).

FIGS. 10a to 10c show perspective views of a third embodiment of the invention. Here too, only the changes present in comparison to FIGS. 7 to 9 are described.

The counter reflector (60) is stationarily connected in this depicted embodiment example to the transport element (33). In order to enable nevertheless a removal or a loading process of the preforms (1), the mouth reflector (72) is configured in a special way. This mouth reflector (72) is arranged on the counter reflector (60) and it has an open U-profile in preform direction. As a result, the preform (1) can be moved in direction toward the counter reflector (60), until a desired positioning is reached. For example, the mouth reflector (72) can be dimensioned so that the preform (1) with the neck ring thereof can bear in a bracing manner against said mouth reflector. FIG. 10a indicates how the preform (1) can be moved in direction toward the counter reflector (60). This occurs, for example, in the area of the transfer wheels (35, 29), for example, supported by grippers or other holding apparatus.

The positioning shown in FIG. 10b is assumed when the transfer to the transport and handling means (33, 41) is partially completed. The neck ring of the preform (1) bears against the mouth reflector (72). However, the head (43) of the holding apparatus (41) is not yet lowered. This occurs only in the transition to the positioning shown in FIG. 10c. The head (43) is located in this positioning in the mouth section (21) of the preform (1) and can now clampingly support said preform.

The positioning represented in FIG. 10c corresponds here to the desired positioning in the area of the heating section (24). The mouth reflector (72) can be completed, for example, in the area of the heating section (24) by an additional mouth reflector element arranged stationarily there to form a largely closed mouth reflector. By comparison, FIGS. 10a and 10b show the positioning in the transfer area of the transport path (301) of the preforms (1).

In the represented embodiment, the mouth reflector (72) is configured to form a single part with the counter reflector (60). However, it can also be implemented as a separate element and fastened to the counter reflector (60). This can also be implemented in a different way, for example, in that the mouth reflector (72) is slidably mounted in radial direction in a direction facing away from the preform. This can occur, for example, against a spring force which presses the mouth reflector (72) into a desired positioning. Such a slidability can be appropriate, particularly if otherwise there is a risk of collisions with other holding apparatus in the transfer area.

FIGS. 7 and 9 show a movability of the counter reflector (60) relative to the transport element (33) in radial or in vertical direction. Mixed forms of these two separately shown movement directions are also conceivable. However, the movement patterns shown are found to be particularly simple and therefore are considered to be preferred relative movements.

It is also conceivable to combine the relative movement, explained in reference to FIGS. 7-9, between transport element (33) and counter reflector (60) and to combine the special embodiments of the mouth reflector (72), which are represented using FIGS. 10a to 10c.

The invention claimed is:

1. An apparatus for heating, transporting and handling preforms made of a thermoplastic material along a transport path through a heating section of a blow molding machine, the apparatus comprising:
   a plurality of heating devices stationarily arranged one after another relative to the transport path;
   a transport chain that is guided on a revolving chain path that, in the heating section, determines the transport path of the preforms; and
   a plurality of chain-link-type transport elements connected to the transport chain;
   wherein each of the plurality of chain-link-type transport elements includes a holding apparatus for holding onto a respective one of the preforms and a counter reflector for reflecting heating radiation from the plurality of heating devices onto the respective one of the preforms held by the holding apparatus, and
   wherein the counter reflector is movably supported by the chain-link-type transport element such that the counter reflector moves in an axial direction and/or a radial direction relative to a longitudinal axis of the respective one of the preforms held by the holding apparatus from a first position to a second position, which is different than the first position, as the transport chain is guided on the revolving chain path.

2. The apparatus according to claim 1, wherein the counter reflector is movably supported in a slidably guided manner in the axial direction and/or the radial direction by a guide pin provided on the chain-link-type transport element.

3. The apparatus according to claim 1, wherein the counter reflector is constrained by a spring force in the first position and is deflectable against the spring force into the second position.

4. The apparatus according to claim 3, wherein the first position is a heating position in which the counter reflector and the respective one of the preforms held by the holding apparatus are transported together through the heating section.

5. The apparatus according to claim 1, further comprising a cam control with a stationary control cam and a cam roller, wherein the cam control is configured and arranged such that movement of the counter reflector is carried out in the axial direction and/or in the radial direction in a loading area of the blow molding machine that precedes the heating section.

6. The apparatus according to claim 1, wherein each of the plurality of chain-link-type transport elements further comprises a mouth reflector for shielding a mouth section of the respective one of the preforms held by the holding apparatus from heating radiation from the plurality of heating devices.

7. The apparatus according to claim 6, wherein the mouth reflector is configured in a shape of a U that opens outward toward the mouth section of the respective one of the preforms held by the holding apparatus.

8. The apparatus according to claim 6, wherein the mouth reflector is arranged on the counter reflector and comprises a part of the counter reflector.

9. The apparatus according to claim 1, wherein the counter reflector is attached to the chain-link-type transport element by screws.

10. The apparatus according to claim 1, wherein the counter reflector is fastened to the chain-link-type transport element.

11. The apparatus according to claim 1, wherein the counter reflector is fastened to the holding apparatus.

12. The apparatus according to claim 5, wherein the cam control is configured and arranged so that the movement of the counter reflector is carried out in the axial and/or in the radial direction in an area of a reversal of the revolving chain path.

13. The apparatus according to claim 6, wherein the mouth reflector is configured to be slidable inward in the radial direction for replacement.

14. The apparatus according to claim 9, wherein the counter reflector is attached to the chain-link-type transport element by screws that are actuatable without use of a tool.

* * * * *